Patented June 22, 1954

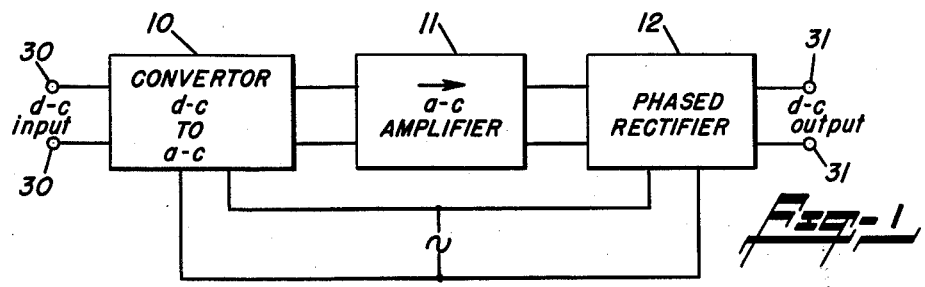
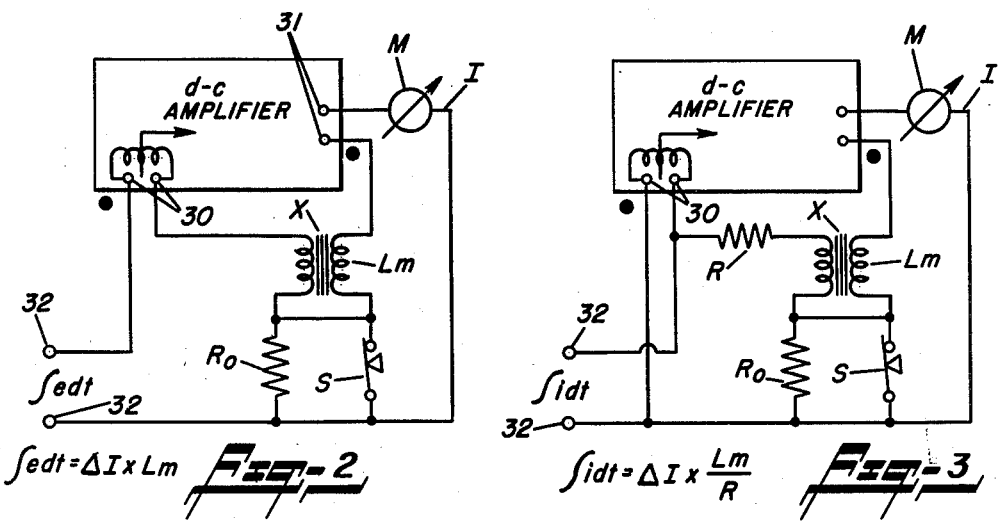
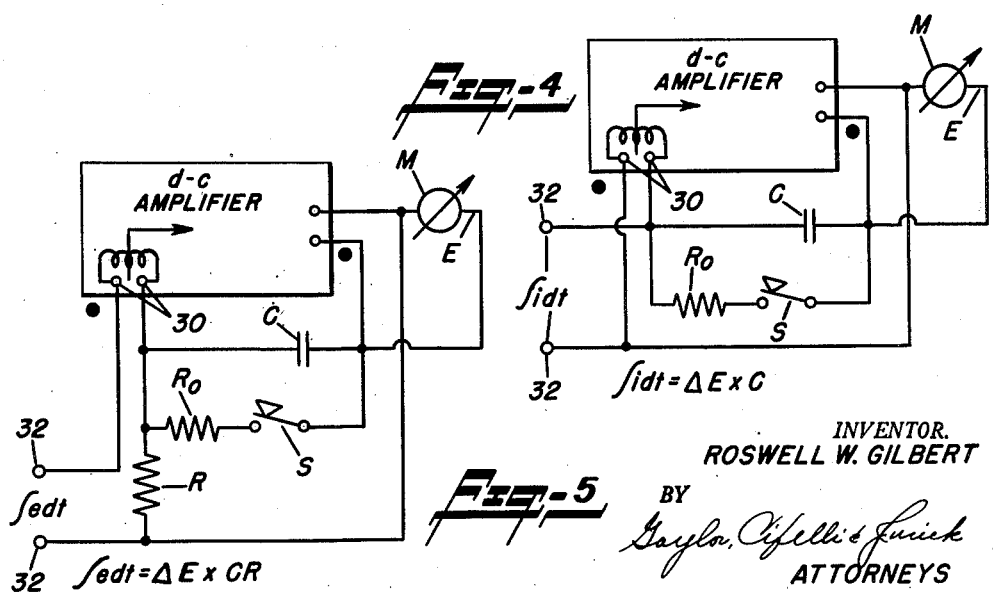

2,681,952

UNITED STATES PATENT OFFICE 2,681,952

INTEGRATING SYSTEM

Roswell W. Gilbert, Montclair, N. J., assignor to Weston Electrical Instrument Corporation, Newark, N. J., a corporation of New Jersey Application December 21, 1950, Serial No. 202,121

1 Claim. (Cl. 179—171)

This invention relates to reactive integrating networks and more particularly to a novel apparatus wherein practical inductive and capacitive components of nominal value may be used for the time integration of D.-C. potentials and/or currents with accuracy and drift characteristics superior to those obtainable with known apparatus.

Apparatus made in accordance with this invention is particularly useful as a magnetic flux meter or a light integrator. Essentially, it comprises a D.-C. amplifier of virtually infinite gain and high phase velocity, with no internal D.-C. feedback path. The output circuit of the amplifier is fed back externally to the input circuit through reactance in a degenerative sense and may be considered an automatic potentiometer with feedback reactance replacing the usual feedback resistance. The feedback is, then, a time-derivative of output level, and the applied input is balanced by a proportionate velocity of output level. Thus, for a transiently-applied D.-C. input, expressible as a time-level integral, the output level will change with a velocity proportionate to the input level to a final level representing the input integral and the value of the coupling reactance. Such output level may be indicated by a suitable instrument interposed in the amplifier output circuit and the scale of the instrument may be calibrated in terms of flux, illumination, brightness, time integrals, or etc. The amplifier serves to supply the energy demand of the indicating instrument, the losses normally associated with the reactive elements, and the storage demand of such reactive elements. By employing a feedback arrangement of this type reactive elements of practical quality may be operated as though they were lossless and there is obtained a long time-constant with negligible tendency of the output to drift or return to zero.

An object of this invention is the provision of an automatic potentiometer employing reactive feedback whereby transient D.-C. inputs produce an output level that represents the input integral and the value of the coupling reactance.

An object of this invention is the provision of an amplifier having input and output circuits, an external reactive feedback circuit connected between the output and input circuits and an indicating instrument connected in said amplifier output circuit.

An object of this invention is the provision of an integrator comprising an amplifier, a reactive element degeneratively connected between the amplifier output and input, an indicating instrument responsive to the amplifier output, and manually-controlled means for reducing the amplifier output to zero.

An object of this invention is the provision of a reactive integrator network comprising an amplifier having virtually infinite gain and high phase velocity, a degenerative reactive feedback loop between the amplifier output and input, and a D.-C. indicating instrument connected in the amplifier output circuit, whereby a transiently-applied D.-C. input expressible as a time-level integral produces an instrument indication that changes with a velocity proportional to the change in the input level to a steady value representing the input time integral and the value of the coupling reactance.

These and other objects and advantages will be apparent from the following description when taken with the accompanying drawings illustrating several embodiments of the invention. The drawings are for purposes of illustration and are not to be construed as defining the scope or limits of the invention, reference being had for the latter purpose to the appended claim.

In the drawings wherein like reference characters denote like parts in the several views:

Figure 1 illustrates, in block form, a D.-C. amplifier of the type suitable for use in the present invention;

Figure 2 illustrates the embodiment of the invention employing an inductive reactance to provide an integrator producing a current output in response to a potential input;

Figure 3 illustrates a somewhat similar arrangement for providing a current output in response to a current input;

Figure 4 illustrates an arrangement employing a capacitive reactance to provide a potential output in response to a current input; and Figure 5 illustrates a modification of the Figure 4 circuit to provide a potential output in response to a potential input.

It is well known that a time-integral response to an input may be obtained directly by an integrating reactance. A simple example would be integration of current by charging a capacitor with the input current, and measuring the capacitor potential without drawing current, as by a vacuum-tube voltmeter. The input integral is then related to the capacity (C) and the capacitor potential (E) as:

$$\int i\,dt \text{ (coulombs)} = C \text{ (farads)} \times \Delta E \text{ (volts)} \quad (1)$$

Conversely, an input potential may be integrated by applying such potential to one winding of a mutual reactor, and measuring the current developed in the other winding when short-circuited. The input integral is then related to the mutual inductance ($L_m$) and the current ($I$) as:

$$\int edt \text{ (volt-seconds)} = L_m \text{ (henries)} \times \Delta I \text{ (amperes)} \quad (2)$$

This second system is normally applicable only to A.-C. because of the short time-constant of practical inductors. It is pointed out that the above systems are duals of each other; currents are inverted to potentials, potentials to currents, and reactances to opposite sign. Also, integration is obtained by conversion of a potential to a current, or by a current to a potential through the medium of a reactance of appropriate sign.

Referring to Figure 1, there is shown a D.-C. amplifier of virtual infinite gain and high phase velocity of a type suitable for the practice of this invention. Such device comprises an input converter 10 for converting the input D.-C. to A.-C., an A.-C. amplifier 11, and a phased rectifier 12. The converter and rectifier are phased from the same A.-C. excitation source so that the output D.-C. is proportional in both polarity and magnitude to the D.-C. input to the converter. Amplifiers of this type commonly employ a 60 cycle contact vibrator as a converter. However, a system such as that described in my United States Patent No. 2,486,641, issued November 1, 1949, wherein conversion is accomplished at a high frequency (for example, 200 kilocycles per second) is preferable because of its superior phase velocity. Reactive feedback networks, as will be described hereinbelow, particularly require a high speed resolution in the feedback amplifier to avoid spurious phase shifts that would result in feedback instability causing oscillation or fall-over.

In the specific system diagrams of Figures 2–5, an amplifier of the type discussed, above, is identified by the block 20, having the corresponding input and output terminals 30, 31, respectively. In each case the output circuit is fed back externally to the input through reactance in a degenerative sense, the polarities being as shown. The feedback is, then, a time differential of output level and the applied input to the system, impressed across the terminals 32, is balanced by a proportionate velocity of output level change. Thus, for a transiently-applied D.-C. input, expressible as a time-level integral, the output level will change with an instantaneous velocity proportional to the instantaneous input level, to a final level representing the time integral at the input level and the value of the coupling reactance.

The four circuits, shown in Figures 2–5, illustrate the four possible combinations of input and output current and potential, with inductive reactance used where the output is a current and capacitive reactance used where the output is a potential. The expressions for the networks are simple ohms-law derivatives, with reactance considered as a time integral of resistance, for example, a henry of inductance would be an ohm-second, and a microfarad of capacitance a micromho-second.

Referring now specifically to Figure 2, it will be noted the amplifier serves to supply the energy demand of the indicating instrument M, and the losses associated with the reactive element. Consider the circuit with the restoring resistor $R_0$ short circuited. With substantially infinite amplifier gain the slightest current demand by the reactor from the source will produce sufficient output current in the meter M to reduce the demand to zero; in other words the amplifier now supplies the reactor demand current. Also, the amplifier supplies the potential demand of the impedances of the reactor and the indicating instrument. This is effectively the result which would be obtained if a simple direct integrating circuit were used with a perfect reactor of zero resistance, short circuited by an indicating instrument of zero resistance and supplied by a source capable of supplying demand current.

In a like fashion the Figure 4 circuit functions as the dual of the Figure 2 circuit.

The circuits shown in Figures 3 and 5 are modifications including the resistance (R) for inversion where both input and output are respectively currents and potentials.

By these feedback methods reactive elements of practical quality may be operated as though they were lossless, and a long time-constant results with little tendency to drift or return to zero. When it is desired to restore the system to zero a resistor $R_0$ may be switched into the feedback loop, by manual operation of the switch S, to restore the system quickly. It will be apparent that opening of the switch S in the circuits of Figures 2 and 3, and closure of the switch in the circuits of Figures 4 and 5, introduces resistive feedback to restore the system to zero. The system will restore exponentially with a time-constant ($K_t$). For inductance feedback:

$$K_t \text{ (seconds)} = \frac{L_m}{R}$$

For capacitive feedback:

$$K_t \text{(seconds)} = CR$$

The circuits of Figures 2 and 4 are particularly useful as a magnetic fluxmeter using a search coil as the input source. The flux linkage change in the search coil produces a potential-time integral of input so that the indicating instrument may be calibrated directly in flux:

Search-coil flux change (Maxwell-turns) $= \int edt$
(abvolt-seconds)

The circuits of Figures 3 and 5 are useful as an integrating light meter for photographic exposure determination, by connection to a barrier-region type of photocell and integrating the developed current. In this case, the instrument may be calibrated in terms of the brightness-time integral (candles/sq. ft.-seconds) or in terms of the illumination-time integral (ft.-candle-seconds).

With a D.-C. amplifier of high resolution sensitivity, and practical reactive components, the illustrated circuits may be designed to have drift rates of less than 0.05 per cent/second, and to reset to zero with a time-constant of less than 0.1 second.

It may here be pointed out that when the input and output are similar, current or potential (Figures 3 and 5), the coupling network must include a resistance R for transposition.

In the inductive reactance circuits (Figures 2 and 3) the reactances are shown as mutual inductances because in practice, self-inductance would include winding resistance in the feedback network. The equivalent in the capacitive reactance circuits, namely, leakage resistance, normally is negligible and, therefore, of no practical significance.

Having now described my invention in detail in accordance with the patent statutes, various changes and modifications will suggest themselves to those skilled in this art, and it is intended that such changes and modifications shall fall within the spirit and scope of the invention as recited in the following claim.

I claim:

In a potential-time integrating system of the type comprising a direct current amplifier having a potential input circuit and a current output circuit, and a mutual inductive reactor coupling the said input and output circuits in degenerative sense to establish a potential feedback that is a function of the rate of change of the output current such that the level of the output current is a function of the time integral of the input potential; an arrangement for conditioning the system for normal operation from a zero level of output current, said arrangement comprising a resistor connecting said output and input circuits and establishing mutual degenerative feedback resistance therebetween, and switch means selectively operable to render said resistor ineffective.

References Cited in the file of this patent

UNITED STATES PATENTS

| Number | Name | Date |
|---|---|---|
| 2,233,415 | Hull | Mar. 4, 1941 |
| 2,251,973 | Beale et al. | Aug. 12, 1941 |
| 2,374,248 | Tuttle | Apr. 24, 1945 |
| 2,448,564 | Wilkerson | Sept. 7, 1948 |
| 2,551,964 | Norton | May 8, 1951 |
| 2,624,796 | Saunders | Jan. 6, 1953 |